United States Patent
Calmettes et al.

(10) Patent No.: US 10,045,318 B2
(45) Date of Patent: Aug. 7, 2018

(54) SOLUTION WITH MASSIVE SPATIAL DISTRIBUTING FOR TELECOM CONSTELLATION

(71) Applicant: THALES, Courbevoie (FR)

(72) Inventors: Thibaud Calmettes, Toulouse (FR); Michel Monnerat, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/379,335

(22) Filed: Dec. 14, 2016

(65) Prior Publication Data

US 2017/0188322 A1 Jun. 29, 2017

(30) Foreign Application Priority Data

Dec. 23, 2015 (FR) .................................... 15 02676

(51) Int. Cl.
| | |
|---|---|
| *H04W 4/00* | (2018.01) |
| *H04W 56/00* | (2009.01) |
| *H04B 1/707* | (2011.01) |
| *G01S 19/00* | (2010.01) |
| *G01S 5/02* | (2010.01) |
| *H04B 7/185* | (2006.01) |
| *H04W 84/06* | (2009.01) |

(52) U.S. Cl.
CPC ......... *H04W 56/002* (2013.01); *G01S 5/0231* (2013.01); *G01S 19/00* (2013.01); *H04B 1/707* (2013.01); *H04B 7/18513* (2013.01); *H04W 84/06* (2013.01)

(58) Field of Classification Search
CPC .... H04W 56/002; H04W 84/06; H04B 1/707; H04B 7/18513; G01S 5/0231; G01S 19/00

USPC ..................................................... 455/427
See application file for complete search history.

(56) References Cited

U.S. PATENT DOCUMENTS

| | | | |
|---|---|---|---|
| 5,233,626 A | 8/1993 | Ames | |
| 5,644,572 A | 7/1997 | Olds et al. | |
| 6,226,494 B1 * | 5/2001 | Lundstrom | ........ H04B 7/18513 342/352 |
| 6,725,034 B1 * | 4/2004 | Diris | .................... H04B 7/1855 455/12.1 |

(Continued)

FOREIGN PATENT DOCUMENTS

| | | | |
|---|---|---|---|
| EP | 2 587 691 A1 | 5/2013 | |
| EP | 2 963 438 A1 | 1/2016 | |

(Continued)

*Primary Examiner* — William Nealon
(74) *Attorney, Agent, or Firm* — Baker & Hostetler LLP (57) ABSTRACT

A satellite communications network, methods of sending, receiving and repetition, and the associated items of equipment wherein the transmission of a signal between a sending station and a receiving station is relayed by a plurality of satellites visible in common to both these stations are provided. The position of the sending station, the receiving station and the satellites relaying the signal is known by at least one of these items of equipment, which is further configured to separate the signals relayed by the satellites, and to compute, for each of the signals, at least one shift introduced by the propagation of the signal, on the basis of the position of the sending station, of the receiving station, and of the satellite by which it is transmitted, and then to apply the inverse shifts to the signal.

21 Claims, 6 Drawing Sheets

(56) References Cited

U.S. PATENT DOCUMENTS

| | | | |
|---|---|---|---|
| 2002/0094781 A1* | 7/2002 | Wreschner | H04B 7/2125 455/67.13 |
| 2012/0139782 A1* | 6/2012 | Gutt | G01S 5/0072 342/357.24 |
| 2013/0106656 A1* | 5/2013 | Calmettes | G01S 1/08 342/386 |
| 2013/0315136 A1* | 11/2013 | Bhaskar | H04B 7/2048 370/316 |
| 2014/0354481 A1 | 12/2014 | Holmes et al. | |
| 2015/0078250 A1* | 3/2015 | Mineta | H04J 13/10 370/320 |

FOREIGN PATENT DOCUMENTS

| | | |
|---|---|---|
| FR | 3 023 379 A1 | 1/2016 |
| WO | 01/48941 A2 | 7/2001 |
| WO | 01/91310 A2 | 11/2001 |

* cited by examiner

SOLUTION WITH MASSIVE SPATIAL DISTRIBUTING FOR TELECOM CONSTELLATION

CROSS-REFERENCE TO RELATED APPLICATIONS

This application claims priority to foreign French patent application No. FR 1502676, filed on Dec. 23, 2015, the disclosure of which is incorporated by reference in its entirety.

FIELD OF THE INVENTION

The invention lies in the field of satellite communications, and deals more particularly with a method of satellite communications in which the communication links are affected by a plurality of satellites.

BACKGROUND

Several recent initiatives are aimed at deploying "massive" constellations of satellites. Massive is intended to mean the fact that they comprise more than 100 satellites. Such is the case for example for two public initiatives with the objective of deployment by the year 2020: OneWeb and SpaceX.

However, the approach of telecom technology in respect of these solutions remains very close to known technologies. It relies in particular on producing satellite spots, each of the spots being served by one of the beams of a particular satellite.

This approach does not actually exploit the massive aspect of the constellation: at a given instant, a receiver has a link with just one satellite, whilst several satellites are generally visible. The link budget is therefore dimensioned within the context of this single link.

In respect of dimensioning constraints on the antennas relating to the desired size of the satellite spots, this approach is rather more oriented towards constellations in low terrestrial orbit (also known as Low Earth Orbit, or LEO). However, the use of LEO satellites leads to greater Doppler effects, shorter visibilities, and therefore more inter-cell transfers (also known as handover). LEO satellites have a less extensive coverage than satellites in higher orbit, and therefore require Inter-Satellite Links (ISLs), and/or more satellite gateways on the ground.

The dimension of the spots cannot be reduced as much as desired because of the bulkiness of the antenna on the satellites. This therefore also generates the necessity to manage residual multiple access, thereby causing a reduction in availability for the user.

Finally, the implementation of satellite spots impacts the design of the satellite, and in particular the design of its antenna. It therefore requires high intelligence in managing the networking.

SUMMARY OF THE INVENTION

The subject of the invention is a novel mode of deployment of a satellite network, suitable for the use of "massive" constellations of satellites, and which consists in supplementing or abandoning the traditional distribution based on beams, so as to utilize the fact that the size of the constellations makes it possible to simultaneously have several satellites visible from the various points of the globe.

Accordingly, it proposes transmission of the signals jointly by way of several distinct satellites. The transmission by each of the satellites takes account of the position of the sender, of the receiver and of the satellite itself, a compensation of the shifts related to the propagation of the signal being carried out in such a way that the signals are recombined at the receiver level without generating interference. The invention is equally relevant at the sending end and at the receiving end, and proposes a coupled system in which the location of each of the parties to the transmission and the recombination of the signals go hand in hand.

The invention therefore consists of a satellite communications network comprising at least one sending station, at least one receiving station, and a plurality of satellites. The network according to the invention is characterized in that a signal transmitted between the sending station and the receiving station is relayed by a plurality of satellites visible in common to both these stations. It is also characterized in that at least one item of equipment from among the sending station, the receiving station and the satellites by which the signal is relayed knows the position of the sending station, the position of the receiving station, and the position of the satellites by which the signal is relayed. This item of equipment is configured to separate the signals relayed by the satellites, and to compute, for each of the signals, at least one shift introduced by the propagation of the signal, on the basis of the position of the sending station, of the position of the receiving station, and of the position of the satellite by which it is transmitted, and then to apply to the signal at least one shift which is inverse to the said computed shift or shifts.

According to one embodiment of the communications network according to the invention, the computation of the shift or shifts is carried out furthermore on the basis of at least one from among a velocity vector of the sending station, a velocity vector of the receiving station, and a velocity vector of the satellite by which the signal is relayed.

Thus, the velocity vector of the satellite is necessary when the latter is not a geostationary satellite, so as to compute and compensate the Doppler effect introduced by the movement of this satellite.

The knowledge of the velocity vector of the sending and/or receiving station is worthwhile when it (they) is (are) moving at a significant speed with respect to the speed of the satellite.

According to various embodiments of the communications network according to the invention, the computation of the shift or shifts comprises at least one from among the computation of a time shift, of a frequency shift, of a shift in phase and of a shift in power.

According to one embodiment of the communications network according to the invention, the separation of the signals relayed by the satellites is carried out by virtue of the use of an active antenna.

According to another embodiment of the communications network according to the invention, the separation of the signals relayed by the satellites is carried out by virtue of the use of a plurality of directional antennas.

According to another embodiment of the communications network according to the invention, the signal transmitted is modulated according to a direct-sequence spread spectrum technique. In this embodiment, the sending station is configured to separate the signals relayed by the satellites by modulating each of these signals by a distinct sequence. Furthermore, the receiving station is configured to separate the received signals relayed by each of the satellites on the basis of the sequence used at the sending end.

According to another embodiment of a communications network according to the invention, a carrier frequency of the signal transmitted by the sending station is adapted as a function of the satellite relaying the transmission. In this embodiment, the sending station is configured to separate the signals relayed by the satellites by applying a distinct frequency shift to each thereof. These signals are therefore sent on different carrier frequencies. The receiving station is configured to separate the signals relayed by each of the satellites on the basis of their carrier frequency.

According to another embodiment of a communications network according to the invention, the sending station is configured to separate the signals relayed by the satellites, and to repeat the signal transmitted, after having applied the appropriate inverse shifts to it. The inverse shifts applied to the signal for each of the repetitions are computed on the basis of different assumptions of a direction of movement of the receiver.

Advantageously, the sending station is configured to send a signal dedicated to a calibration of the inverse shifts applied to the signals.

Advantageously, the sending station and the receiving station are furthermore configured to exchange a synchronization message successively by each of the satellites used to relay the transmission before transmitting the signal.

Advantageously, the sending station and the receiving station are furthermore configured to exchange a synchronization message simultaneously by each of the satellites used to relay the transmission before transmitting the signal.

The invention also addresses a method for sending a signal from a sending station to a receiving station in a satellite communications network, the said network comprising a plurality of satellites visible in common both to the sending station and to the receiving station, the said sending station knowing its position as well as those of the receiving station and of the satellites visible in common, and being configured to separate the signals transmitted towards the satellites visible in common. The method according to the invention comprises the steps of:

selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, computation, for each of the satellites selected, of a pre-compensated signal by applying at least one shift which is inverse to the computed shift or shifts, and sending, to each of the selected satellites, the pre-compensated signal associated therewith.

Thereafter, the invention addresses a method for receiving a signal transmitted between a sending station and a receiving station in a satellite communications network, the said network comprising a plurality of satellites visible in common both to the sending station and to the receiving station, the said receiving station knowing its position and those of the sending station and of the satellites visible in common, and being configured to separate the signals received from the satellites of the network, the signal being relayed by a plurality of satellites from among the satellites visible in common. The method according to the invention is characterized in that it comprises the steps of:

selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, reception of the signal from each of the satellites selected, computation, for each of the satellites selected, of a compensated signal by applying to the signal received at least one shift which is inverse to the computed shift or shifts, and summation of all the compensated signals.

Finally, the invention addresses a method for repeating a signal in a satellite during the transmission of a signal between a sending station and a receiving station in a satellite communications network, the said satellite being one from among a plurality of satellites of the network visible in common both to the sending station and to the receiving station, the said satellite knowing its position, the position of the sending station, and the position of the receiving station, and having means for separating the signals received from the sender and the receiver. The method according to the invention is characterized in that the signal is relayed by a plurality of satellites, and in that it comprises the steps of:

reception of the signal transmitted from the sending station, computation of at least one first shift related to the propagation of the signal between the sender and the satellite on the basis of the position of the satellite, and of the position of the sender, computation of at least one second shift related to the propagation of the signal between the satellite and the receiver on the basis of the position of the satellite and of the position of the receiver, computation of a compensated signal, by applying to the signal received shifts which are inverse to the first and to the second computed shifts, and sending the compensated signal to the receiving station.

The invention also applies to the following items of equipment:

Sending station configured to implement a method for sending a signal such as described above.

Receiving station configured to implement a method for receiving a signal such as described above.

Satellite configured to implement a method for repeating a signal such as described above.

BRIEF DESCRIPTION OF THE DRAWINGS

The invention will be better understood and other characteristics and advantages will become more clearly apparent on reading the nonlimiting description which follows and by virtue of the appended figures among which.

DETAILED DESCRIPTION

The invention is relevant within the context of a satellite network, in particular but not necessarily when the latter is massive, that is to say when it comprises a number of satellites such that several of them are generally visible to one and the same geographical zone.

The invention can be substituted for a satellite network whose deployment is carried out by beams, but can also be integrated as a supplement to such a satellite deployment.

Hereinafter, the terms sender and receiver will be employed. Sender is intended to mean the item of equipment originating the transmission, and receiver the item of equipment receiving the transmission. These items of equipment may equally well be sending stations or receiving stations, such as satellite gateways, terminals, satellite telephones, distress beacons, or any other item of equipment suitable for satellite communications. Furthermore, the invention also applies to the satellite's remote-command telemetry signals, serving to monitor and programme the satellite itself. In this case, the receiver and the satellite are one and the same entity, the diversity stemming from several sending stations transmitting the same remote-command, or from one and the same sending station having antennas at various geographical positions, thereby making it possible to apply the device to several satellites at the same time by combining the signals on the network of antennas in such a way that the recombination in phase is coherent only in the desired direction.

The terms up-path and down-path will also be employed. The trajectory of the communications being the passage from a sender to a satellite, and the retransmission of the signal from the satellite to a receiver, the up-path designates the sender—satellite segment, while the down-path designates the satellite receiver segment.

Finally, the term satellite visible in common will be employed when a satellite is visible both to the sender and the receiver. These satellites are not necessarily in one and the same zone, and are not necessarily visible to one another.

To date, on account of the novelty of deployment of massive constellations of satellites, just one solution is known using multiple visibilities, and this not with the aim of implementing a communication network, but to allow the location of a distress beacon of unknown position. This solution is presented in French patent application FR 1401510. In this system, implemented under the name MEOSAR (acronym standing for Medium Earth Orbit Search And Rescue), a distress signal is sent by a beacon, and retransmitted to a satellite gateway by all the satellites visible to the beacon and to the station. The gateway traverses a grid of possible positions of the distress beacon, and applies, for each point of the grid, different shifts to each of the received signals, the shifts being dependent on the position of the grid tested, of the satellite, and the position of the satellite gateway. The signals are thereafter recombined.

The present invention proposes an alternative satellite communication solution to the conventional beam-based satellite deployment techniques, which is less expensive, more effective, and suitable for so-called "massive" constellations of satellites. Accordingly, it extends the method of French application FR 1401510 beyond the simple location of a beacon, and applies it both to the up-path and to the down-path. Several embodiments applicable to the uplink and to the downlink are described, as well as a method for calibrating the transmissions and receptions. All the embodiments start from the basic postulate that the position of the various parties to the network (sender, satellites used for relay and receiver) is known. In contradistinction to patent application FR 1401510 which requires exactly 4 satellites visible in common both to the beacon and to the satellite gateway, the invention applies whatever the number of visible satellites used for the transmission. The performance gain is relative to this number of satellites, and equals approximately 10.log(N), where N is the number of satellites that are visible.

Figure 1:
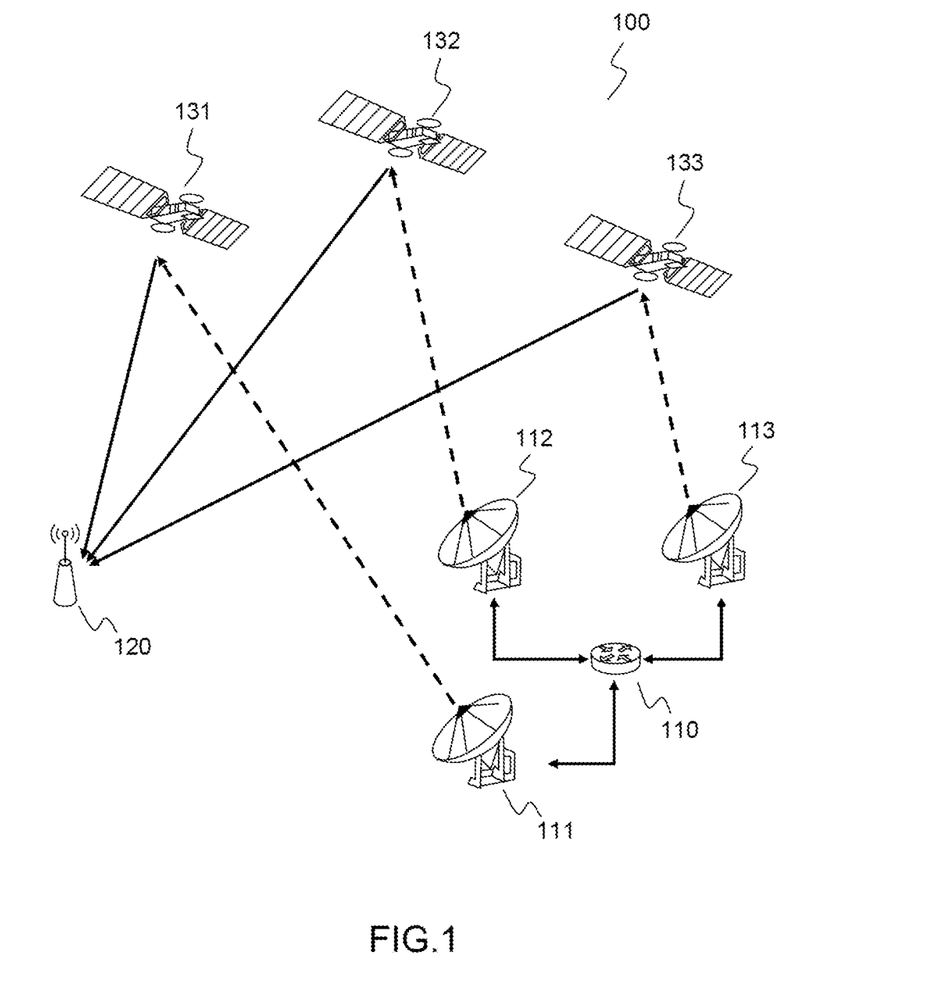
FIG. 1 presents a satellite network in which the sender has means for separating the signals, and where the invention is implemented according to a first embodiment.

FIG. 1 presents a satellite network 100 in which the sender has means for separating the signals, and where the invention is implemented according to a first embodiment.

The satellite network comprises a sender 110, transmitting a message bound for a receiver 120. The transmission is relayed in parallel by way of three satellites 131, 132 and 133, visible in common both to the sender and to the receiver.

The sender comprises means for separating the transmitted signals bound for each of the satellites. These signal separators allow geometrical separation and distinct processing of the signals transmitted to each of the satellites. In FIG. 1, these means are embodied in the form of three directional antennas 111, 112 and 113, each of the antennas being pointed towards a different satellite. Other implementations are possible, such as for example the use of an active antenna. Active antennas are antennas comprising a multitude of radiating elements making it possible to steer the radiating pattern of the antenna so as to form beams in one or more given directions. More precisely, the same signal is sent on each of the radiating elements, but applying a phase shift to each of them beforehand. Thus only the satellites in the direction where the signal's optical path difference is equal to the opposite of the phase shifts applied (this corresponding to a precise direction in terms of azimuth and elevation) will receive the sum signal in a coherent manner, the sum signal being zero in the other directions. It is thus possible to differentiate the directions of pointing of the beams, and to transmit a different signal bound for each of the beams.

The sender 110 knows its own position, as well as the position of the satellites 131, 132 and 133 used to relay the transmission. It also requires the knowledge of the velocity vector of the satellites, that is to say their ground speeds of movement associated with their directions of movement. This knowledge of the velocity vector is not necessary when the satellites are geostationary satellites, their speed of movement then being considered to be zero. The information relating to the positions and movements of the satellites is transmitted by the ephemerides, according to procedures well known to the person skilled in the art.

The sender also knows the position of the receiver 120. When the topology of the network is fixed, then this position can be programmed in advance. When the topology of the network might evolve, this position can for example be acquired by the receiver by virtue of GNSS positioning (the acronym standing for Global Navigation Satellite System), and transmitted by a low-bitrate message during the terminal's network entry phase, and then regularly updated. Accordingly, it will be possible to consider that this low-bitrate exchange for the initial position (and its possible evolutions) may be done on a channel separated in terms of frequency, time (with periodic signalling windows for example), or spreading code. In a CDMA environment, it can also be done with a narrow-band low-bitrate modulation without spreading on top of the CDMA modulations.

Based on the knowledge of these positions, the sender is capable of computing, for each of the satellites used to relay the transmission, the shifts applied to the signal during its propagation.

These shifts are of several types:

time shift, related to the travel time relating to the propagation between the sender and the satellite, then to the propagation between the satellite and the receiver. Calling E the position vector of the sender, and R the position vector of the receiver, the propagation time (in seconds) is $\|R-E\|/c$, with c the speed of light in vacuo. The computation has to be done a first time for the time shift between the sender and the satellite, and then a second time for the time shift between the satellite and the receiver, the total time shift being the sum of these two travel times.

frequency shift, or Doppler shift, associated with the relative movement of the satellite with respect to the sender, and with the relative movement of the satellite with respect to the receiver. Using the same notation as hereinabove, and taking $V_E$ to be the velocity vector of the sender, and $V_R$ the velocity vector of the receiver, the Doppler shift, expressed in Hz, is given by:

$$\frac{(V_E - V_R) \cdot (R - E)}{(c * \|R - E\|) - V_E \cdot (R - E)} * f,$$

with f the transmission frequency, the dot operator being the scalar product. The computation has to be done a first time for the frequency shift between the sender and the satellite, and then a second time for the frequency shift between the satellite and the receiver, the total frequency shift being the sum of these two values. The ground speed of movement is generally negligible with respect to the speed of the satellites, which is of the order of 5 km/sec for an MEO constellation (the acronym standing for Medium Earth Orbit) and of 7 to 8 km/sec for an LEO constellation (the acronym standing for Low Earth Orbit). Thus, the value of the frequency shift can be computed in a fairly precise manner taking only the movement of the satellites into account. The speed of movement of the sender or of the receiver can nonetheless be taken into account when at least one among them is moving rapidly, such as for example in the case of a station onboard an aeroplane, or when the envisaged satellites are geostationary satellites, for which the speed of movement can be considered to be zero, shift in power, related to the power variation of the signal due, on each of the ground-satellite and satellite-ground segments, to the link budget losses consisting of the free-space losses, but also to the antenna gains at the sending end and at the receiving end, the antenna gains being dependent on the elevation and the azimuth of transmission and reception. A total power shift, the sum of the shift in power on the up-path and of the shift in power on the down-path, can then be computed, shift in phase, related to the central frequency used for the transmission, and to the distance traveled by the signal, the shift in phase observed at the receiving end of a signal sent from E and received at R being the remainder of the Euclidean division of $\|R-E\|/\lambda$, with $\lambda$ the wavelength of the signal.

For each of the satellites, the sender is able to compute at least one, or indeed the totality of the above-mentioned shifts, and to apply the inverse (or opposite) shift to the signal transmitted by way of this satellite.

The inverse shift of a time shift consists in advancing the instant of signal sending by a duration equivalent to that computed for the satellite. According to an alternative embodiment, it is possible to compute a reference shift, for example a mean shift, between the signals transmitted via the various satellites, and then to compute, for each of these satellites, a relative shift with respect to this reference shift, and to shift the transmitted signal by the inverse of this relative shift.

The inverse shift of a frequency shift consists in frequency shifting the transmitted signal by a value opposite to that computed for the satellite.

The inverse shift of a power shift consists in increasing the power of the sent signal by a power level equal to the power attenuation measured for the satellite.

An alternative to the power shift indicated hereinabove consists in defining a target power level, and in amplifying or attenuating the power of the signal sent by way of each of the satellites in such a way that all the signals are received with the predefined power level.

The inverse shift of a phase shift consists in applying a phase offset to the signal transmitted which is inverse to the computed phase offset.

An alternative to the phase shift indicated hereinabove consists in defining a target phase on reception of the signal sent by way of each of the satellites, and in modifying the initial phase of the signals transmitted in such a way that all the signals are received with a substantially identical phase.

The precise estimation of the phase shift, in particular when the signals are transmitted on high carrier frequencies and over considerable distances, as is the case for satellite links, is very sensitive, a poor estimation possibly being a source of error.

Thus, the sender 110 is able to compute at least one, or indeed all, of the above-mentioned shifts, for each of the satellites 131, 132 and 133, and to compute, for each of these satellites, a pre-compensated signal.

This pre-compensation of the signals at the sending end makes it possible to remove the interference between them when they are received by the receiver. Indeed, a time gap between two signals received from different satellites can create inter-symbols interference which considerably degrades the link budget. A phase gap between two received signals can be constructive if the phase shift is close to a multiple of $\pi$, the received equivalent signal power then being the sum of the powers of each of the signals received, but also destructive if it is close to N $\pi/2$, N being an odd integer, the received equivalent signal power then being the difference between the powers of the received signals. A frequency shift is manifested in the form of variations of the phase shift between the signals, the recombinations between the signals then oscillating between constructive and destructive recombination, the tempo of the oscillation being related to the frequency gap. Finally, a power shift between signals received, though it is less constraining than the other shifts mentioned, must be estimated and taken into account during recombination for fear of adding decorrelated noise of different levels, the highest level then becoming dominant.

When sending, it is therefore desirable to compute and to pre-compensate at least the time shifts, frequency shifts and phase shifts before sending the signals to all the satellites.

The receiver 120 does not necessarily have means for separating the pathways.

When it does not have any, it receives a single signal, the sum of the signals relayed by each of the satellites. Through the shift pre-compensations carried out at the sending end, the signals received do not exhibit any time-related and frequency-related phase shifts. They are synchronized, in time, frequency, power and phase according to the estimated and pre-compensated shifts. They therefore recombine with one another in an optimal and constructive manner, the signals relayed by the various satellites summing constructively without generating interference, thus making it possible to afford the signal a gain dependent on the number of satellites used for the transmission.

In the case where it has means for separating the signals, reception is simplified in that, the received signals being synchronized at the position of the receiver, it is not necessary to implement any synchronization processings at the receiving end to recombine the signals, simple summation being sufficient.

The invention is compatible with the use, by the sending station, of several satellite gateways situated in distant geographical zones, on condition that the latter are synchronized, and that they can exchange data by terrestrial means (e.g.: Internet, optical fibre link, etc.). This embodiment makes it possible to increase the number of satellites visible in common both to the sending station and to the receiving station, and therefore the transmission gain.

In an alternative embodiment, whose representation is equivalent to that of FIG. 1, the signal is transmitted by a sending station using a direct-sequence spread spectrum transmission technique. Direct-sequence spread spectrum consists in modulating the signal to be transmitted by a known spreading sequence of higher frequency. The chosen sequence is akin to a code which, if it is known to the receiver, enables it to distinguish the transmissions sent in one and the same frequency band.

The receiver knows its position and the position of the sender, as well as the positions of all the satellites visible in common both to the sender and to the receiver. If appropriate, it may also know its velocity vector, the velocity vector of each of the satellites, and/or the velocity vector of the sender.

In this embodiment, the sender 110 uses a different spreading sequence during the transmission of the signal to each of the satellites used, but does not carry out any estimation or pre-compensation of the shifts.

The receiver 120, which does not have any multiple antennas or adaptive antenna, nonetheless separates the signals received from each of the satellites, on the basis of the sequence used when sending these signals.

Once the signals have been separated, the receiver is able, knowing the positions (and velocity vectors) of all the parties to the transmission, to compute for each of the signals the time shifts, frequency shifts, phase shifts and/or power shifts to which it has been subjected during its propagation, and to compensate them in reverse.

It is thereafter possible to sum all these signals, which recombine constructively without generating any interference, and to utilize the resulting signal.

Though this embodiment is more expensive in terms of bandwidth, due to the use of spread spectrum modulation, it allows a gain in terms of transmission power, the spectrum spreading making it possible to implement links at much lower noise ratio levels. It cannot, however, be applied to the return pathway if the receiver does not have means for separating the signals that it dispatches to the various satellites.

In the case where the sender is moving at a considerable speed, it can pre-compensate the Doppler shift generated by this movement.

According to another embodiment, the sender has means for separating the signals transmitted to the various satellites in charge of the transmission of the signal between the sender and the receiver, but does not necessarily know the position of the receiver. It then applies a frequency shift to the transmitted signal, this shift being known and different as a function of the satellite in charge of the relaying of the signal.

The receiver, which does not have any multiple antennas or adaptive antenna, nonetheless differentiates the signals received from each of the satellites, on the basis of their carrier frequency. The sender and the receiver then both have means for separating the signals received from the various satellites. For the sender, these means are hardware (use of directional antennas), while for the receiver, these means are either software (signal processing algorithms making it possible to dissociate the transmitted signals according to their carrier frequency), or hardware (plurality of parallel radio chains set to different carrier frequencies), and make it possible to differentiate the signals received as a function of their carrier frequency.

In this embodiment, the receiver has one or more radio chains whose total bandwidth is large enough to allow it to receive all the signals transmitted by each of the satellites on a different carrier frequency. It must also be capable of restoring to baseband and filtering the signals transmitted on each of the carrier frequencies, thus separating the various signals received.

Once the signals have been separated, the receiver can, knowing the positions (and speeds) of all the parties to the transmission, compute time shifts, frequency shifts, phase shifts and/or power shifts for each of the signals, and compensate them in reverse.

It thereafter sums all these signals, which recombine constructively without generating interference.

Though this embodiment is more expensive in bandwidth and increases the complexity of the radio chain or of the processings of the receiver, it makes it possible to implement the separation of the signals at the receiver level without requiring the use on the latter of multiple antennas or of active antennas.

Finally, another embodiment, intended to allow operation directed towards a receiver whose position, speed and direction of movement are not known or are known only roughly, consists in carrying out, when sending, a repetition of the signal, by applying shifts computed on the basis of different movement assumptions to each repetition.

Thus, in the case for example of an aeroplane moving at a high speed, several different assumptions regarding directions of movement are envisaged. One example consists in making assumptions regarding direction of movement each varying by 30° and/or assumptions regarding speed varying by 100 km/h, and/or all the associated combinatorics. Each of these assumptions culminates in a different computation of time shift, frequency shift, phase shift and/or amplitude shift according to the satellite used to transmit the signal. The signal is therefore transmitted several times to all the satellites, each repetition being carried out on the basis of signals pre-compensated with the inverse of shifts computed on the basis of different assumptions. At the receiving end, the repetitions of the signal will sum constructively or destructively, with or without interference, depending on the assumptions made. The receiver will then be able to demodulate and process the signal corresponding to the most relevant assumption.

This mode of operation allows a gain in regard to the quality of the signal received when the assumption made is close to the actual movement of the receiver, doing so at the cost of a decrease in the bitrate. This decrease is directly related to the number of assumptions tested, and therefore to the desired precision in the applied shifts.

Figure 2:
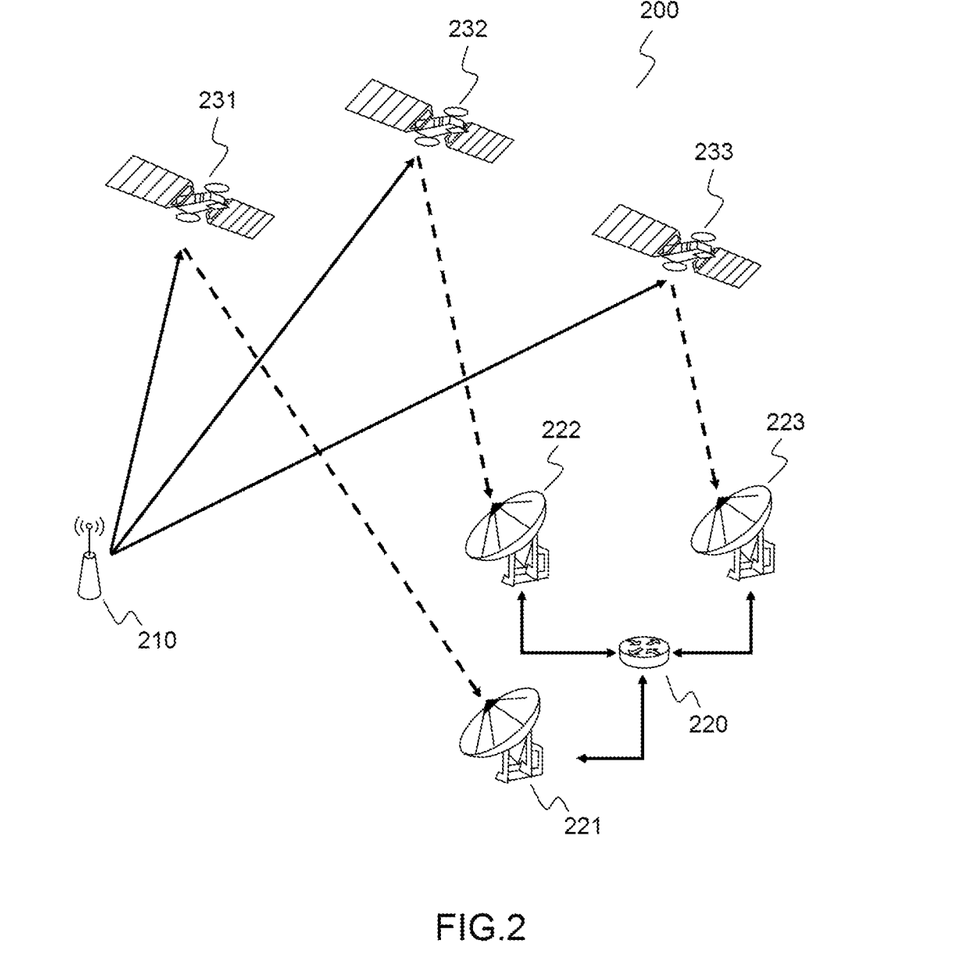
FIG. 2 presents a satellite network in which the receiver has means for separating the signals, and where the invention is implemented according to a second embodiment.

FIG. 2 presents a satellite network 200 in which the invention is implemented according to a second embodiment. This embodiment is distinguished from the first in that the sender does not have means for separating the signals, in contradistinction to the receiver.

In this embodiment, the satellite network 200 comprises a sender 210, transmitting a message bound for a receiver 220. The transmission is carried out by way of three satellites 231, 232 and 233.

The receiver comprises means for separating the transmitted signals bound for each of the satellites. In FIG. 2, these means are embodied in the form of three directional antennas 221, 222 and 223, each of the antennas being pointed towards a different satellite. Other implementations are possible, such as for example the use of an active antenna whose beams are directed towards each of the satellites.

The receiver 220 knows its own position (and velocity vector), as well as the position (and the velocity vector) of the satellites 131, 132 and 133. These latter items of information are transmitted thereto by the ephemerides, according to a procedure well known to the person skilled in the art. The receiver also knows the position (and velocity vector) of the sender 210.

The sending station sends the signal in an undifferentiated manner bound for all the satellites. These relay the signal in parallel towards the receiver, which uses its separating means to receive them in a differentiated manner.

On the basis of the positions of all the parties to the transmission, and if appropriate of the velocity vectors of the satellites, the receiver is then able to compute, for each of the satellites, shifts relating to the propagation of the signal, and to compensate these shifts. Just as for the example presented in FIG. 1, these shifts can be time shifts, frequency shifts, phase and/or power shifts.

When the receiver moves, it knows its position, its direction and its speed, and can then also compensate the Doppler effect generated by its movement. It can also compensate the Doppler effect generated by the movement of the sender when the latter's velocity vector is known.

The signals having been compensated, computed shifts are thereafter summed and utilized normally by the receiver.

The logic for reconstructing the signal at the receiver level will usually rely on techniques of coherent and incoherent correlation.

In a preferential embodiment, the receiving station compensates the shifts in time, in frequency, and in power. After compensation of these shifts, the signal is received identically on each of the pathways, except as regards its phase. Indeed, the phase shifts are easy to correct at the receiver level, provided that the sources are differentiated there, and more complicated to correct at the system level since they then require very good mastery of the geometry, typically a few percent of the wavelength (or in the range of frequencies traditionally used for satellite transmissions, a few centimeters), or a calibration process leading to the same performance.

In the case of this embodiment where the phase is not compensated on the basis of the network geometry, the latter can be corrected on the basis of the inter-signal correlation properties. Thus, to reset two signals received on different pathways in terms of phase, it is possible to carry out the complex multiplication between the first signal and the conjugate of the second signal. The result of the correlation over an arbitrary time range is a complex number whose phase represents the phase difference between the two signals over this interval. By proceeding with correlation windows of size consistent with the possible residual error in time and in frequency, it is therefore possible to estimate the relative phase in a periodic manner, without needing to know the content of the signals. Once these relative phases are known, they are compensated and the coherent sum signal is constructed for demodulation. This manner of operation is made possible only because the signals are synchronized in time and in frequency.

The same correlation process can also serve to identify the presence of signal, and to refine the estimations of time, frequency and power, in its so-called "incoherent" approach, that is to say where only the modulus of the complex correlation is evaluated. This modulus is at a maximum when the signals are correctly aligned in time and in frequency, its amplitude being the product of the powers of the two satellites. Stated more simply, the result of the correlation contains in its argument the phase difference, and in its modulus the information regarding general alignment of the signals without phase shifts. Several time/frequency shift assumptions can then be tested, retaining only the one which has the maximum correlation amplitude, without worrying about the phase difference in this first step. Once the maximum has been found, the phase differences will be given by the arguments of the correlations.

These correlation-based procedures very extensively underpin contemporary satellite communication and navigation technologies, such as for example GPS (the acronym standing for Global Positioning Satellite), and are in this sense very widespread in mobile terminals. In particular, very low-consumption and very low-cost ASIC chips (the acronym standing for Application Specific Integrated Circuit) exist which are suitable for these processings (capacities attain thousands of correlators). An industrial implementation in a miniaturized receiver could therefore on the one hand rely on this legacy to define and develop an effective solution at lesser cost, and on the other hand be integrated into a single chip which would be in charge of the correlations necessary for location, of the correlations necessary for signal recombination, and even also of the correlations necessary for demodulating the communication signals in the case of spread spectrum signals.

According to another embodiment, the sender and the receiver both have means for separating the signals relayed by each of the satellites. In this embodiment, the sender knows its position and the position of all the satellites used to relay in parallel the transmission of the signal. It can thus pre-compensate the signal in respect of the shifts related to the propagation on the upgoing link. The receiver also knows its position, and the position of all the satellites used to relay the transmission of the signal. It then carries out the post-compensation of the signals received in respect of the shifts related to the propagation on the downgoing link.

Figure 3:
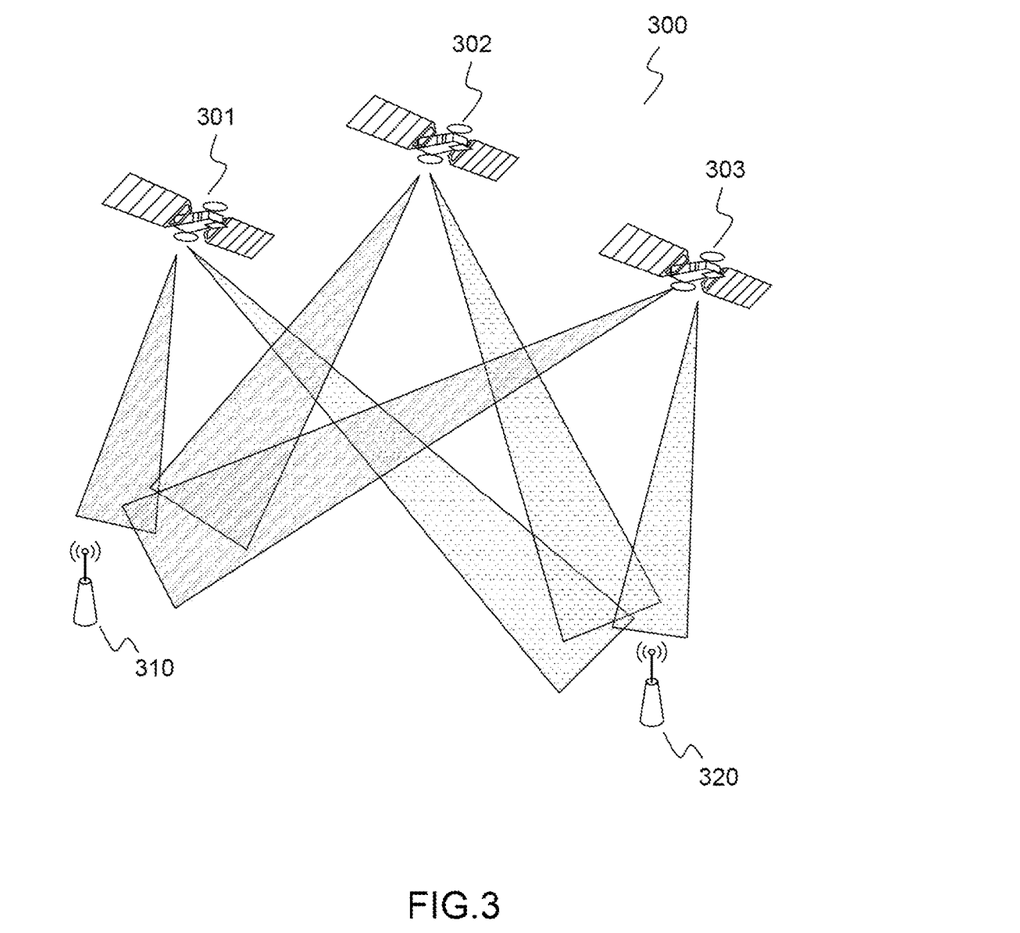
FIG. 3 presents a satellite network in which each of the satellites has means for separating the signals, and where the invention is implemented according to a third embodiment.

FIG. 3 presents a satellite network 300 in which each of the satellites 301, 302 and 303 has means for separating the signals, and where the invention is implemented according to a third embodiment.

In this embodiment, the satellites used to relay the signal between the sender 310 and the receiver 320 know their position, as well as the position of the sender and the position of the receiver. When the satellites are non-geostationary, they also know their velocity vector. They furthermore have means for separating between the up-path and the down-path. In FIG. 3, these means consist of an active antenna exhibiting several beams, the sender and the receiver being in different beams. Other solutions are possible, such as for example the use of orthogonal polarizations. It is also possible to use, at the level of the satellites, omnidirectional antennas (omnidirectional is intended to mean the fact that it covers the Earth with a uniform gain, the antenna preferably not sending in directions other than towards the Earth), the means for separating between the up-path and the down-path being the instants of sending the signals.

In this embodiment, each of the satellites is able—on the basis of its knowledge of the positions of the sender, of the receiver, and of its own position (and if appropriate of its velocity vector, as well as those of the sender and/or of the receiver)—to post-compensate the signals received from the sender in respect of the shifts due to the propagation between the sender and it, and to pre-compensate the same signal before its retransmission in respect of the forthcoming shifts related to the propagation between it and the receiver.

The signals received by the receiver from each of the satellites 301, 302 and 303 are then synchronized, and recombine constructively.

This mode of reception makes it possible to lighten the antennal constraint on the sender or the receiver, which can then make do with omnidirectional antennas. However, this reduction in constraint is manifested by an increase in the constraint on the satellite: multi-beam antenna, necessity to know the position of the sender and of the receiver, and carrying out computations of shifts to be applied.

The invention also comprises a method of sending a signal by a sending station, the signal being relayed by way of a plurality of satellites in parallel, the signal transmitted to each of these satellites being pre-compensated in such a way that it reaches the receiver from all the satellites in a synchronized manner.

The sender possesses the knowledge of its position and of the position of the receiver, as well as the position (and velocity vector) of each of the satellites used for the transmission of the signal. It also has means enabling it to be able to transmit the signal independently to each of the satellites used.

Figure 4:
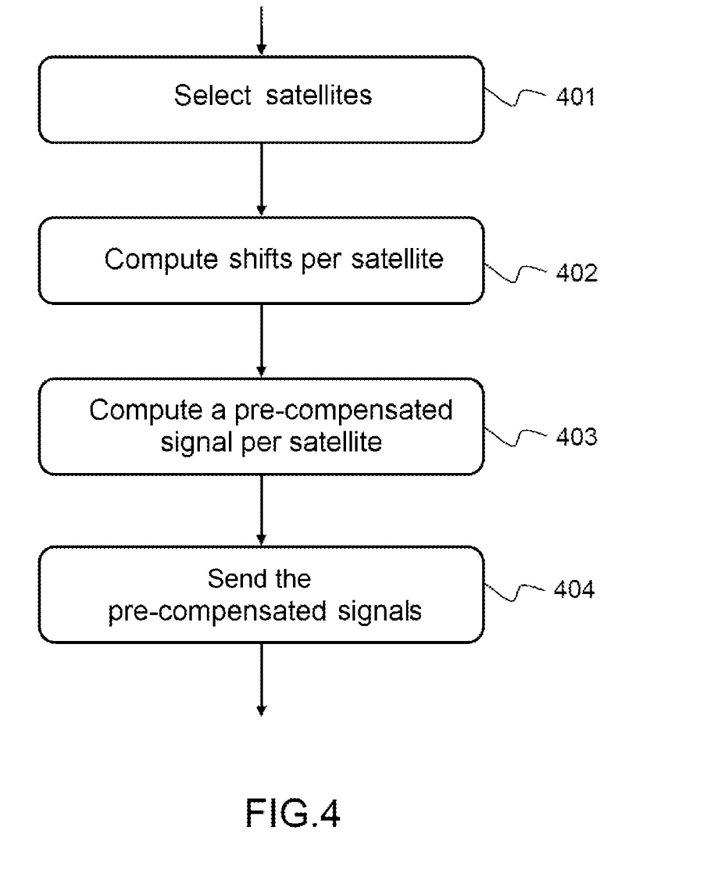
FIG. 4 presents a chart of the steps carried out by the communication method according to the invention when it is executed at the sending end.

FIG. 4 presents a chart of the steps carried out by the communication method according to the invention when it is executed by the sender.

This method comprises a first step 401 of selecting, from among all the satellites visible in common both to the sender and to the receiver, at least two satellites used to relay the transmission of the signal. This step makes it possible to limit this number to the needs required for the transmission, and to adapt the number of satellites to the capacities of the means for separating the signals of the sender. In the case where all the satellites are used for the transmission, this step is akin to selecting all the satellites, and is transparent.

The method also comprises a second step 402 of computing, for each of the satellites selected during the first step to carry out the transmission, at least one shift. Here this entails computing at least one shift from among a time shift, a frequency shift, a phase shift and a power shift. These shifts are related to the position (and to the movement) of the satellite, as well as to the respective positions of the sender and of the receiver (and their movements).

The method furthermore comprises a third step 403 of computing a pre-compensated signal to be transmitted by the sender to the satellite, the pre-compensation being the application of shifts which are inverse to the shifts computed during the second step.

Finally, the method comprises a fourth step 404 of sending, by the sending station, all the signals computed during the third step. Each of the pre-compensated signals is transmitted to the corresponding satellite, which repeats it towards the receiver. Thus, all the signals reach the receiver in a synchronized manner, and sum constructively.

The first step can be carried out only periodically, the period of carrying out this step varying as a function of the time necessary for the satellites visible to the receiver and to the sender to vary in such a way as to influence the results of the first step of selecting the satellites.

Likewise, the sending of several pre-compensated signals can be carried out by taking as input one and the same computation of shifts, the period of carrying out the step of computing the shifts varying as a function of the time necessary for the movement of the satellite, of the sender and of the receiver to vary in such a way as to influence the results of the computations of shifts carried out in the second step.

The invention moreover comprises a method for receiving a signal in a receiving station, the transmission of this signal being relayed by way of a plurality satellites in parallel, the signals received from each of these satellites being post-compensated for the shifts undergone in the course of their propagation so as to be able to be combined constructively.

The receiver possesses the knowledge of its position, of the position of the sender, as well as the position (and velocity vector) of each of the satellites used for the transmission of the signal. It also has means enabling it to be able to receive the signal in a differentiated manner from each of the satellites used.

Figure 5:
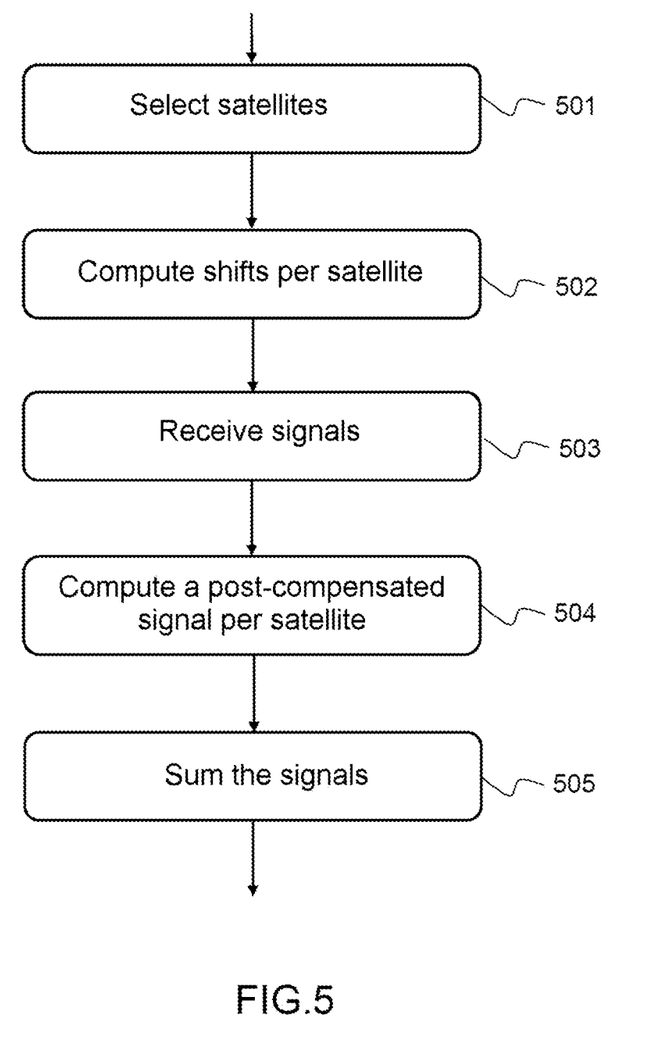
FIG. 5 presents a chart of the steps carried out in the communication method according to the invention when it is executed at the receiving end.

FIG. 5 presents a chart of the steps carried out by the communication method according to the invention when it is executed by the receiver.

This method comprises a first step 501 of selecting, from among all the satellites visible in common both to the sender and to the receiver, at least two satellites used to relay the transmission of the signal. This step makes it possible to limit this number to the needs required for the transmission, and to adapt the number of satellites to the capacities of the means for separating the signals of the receiver. In the case where all the satellites are used for the transmission, this step is akin to the selecting of all the satellites, and is transparent.

In the case where all the satellites are used for the transmission, this step is akin to the selecting of all the satellites, and is transparent.

The method thereafter comprises a second step 502 of computing, for each of the satellites selected during the first step to carry out the transmission, at least one shift. Here this entails computing at least one shift from among a time shift, a frequency shift, a phase shift and a power shift. These shifts are related to the position (and velocity vector) of the satellite, and to the positions of the sender and of the receiver.

It furthermore comprises a third step 503 of receiving the signal, in a differentiated manner from each of the satellites selected during the first step.

The method also comprises a fourth step 504 of computing, for each of the satellites selected, a post-compensated signal by using the shifts computed during the third step. Shifts which are inverse to these shifts are then applied to the signal received during the third step, for each of the satellites selected for the transmission.

Finally, the method comprises a fifth step 505 of summing the various signals post-compensated during the fourth step. The signals then being synchronized, they sum constructively, without generating interference.

In a manner similar to the sending method, the steps of selecting the satellites used, and of computing the shifts can be carried out at a slower tempo than that of the reception of the messages.

The invention also comprises a method of repetition by a satellite of a signal, the transmission of this signal being carried out by way of a plurality of satellites in parallel, including the satellite on which the method is carried out, the signals received from each of these satellites being compensated so as to arrive synchronized at the receiver.

The satellite possesses the knowledge of its position (and of its velocity vector when it is a non-geostationary satellite), as well as of the position and potentially of the velocity vector of the sender and/or of the receiver. It also has means allowing it to receive the signal in a differentiated manner between the sender and the receiver. These means possibly being for example a multi-beam antenna, or simply a time-division multiplexing of the transmitted signals, distinct time slots being allocated to each of the stations of the network.

Figure 6:
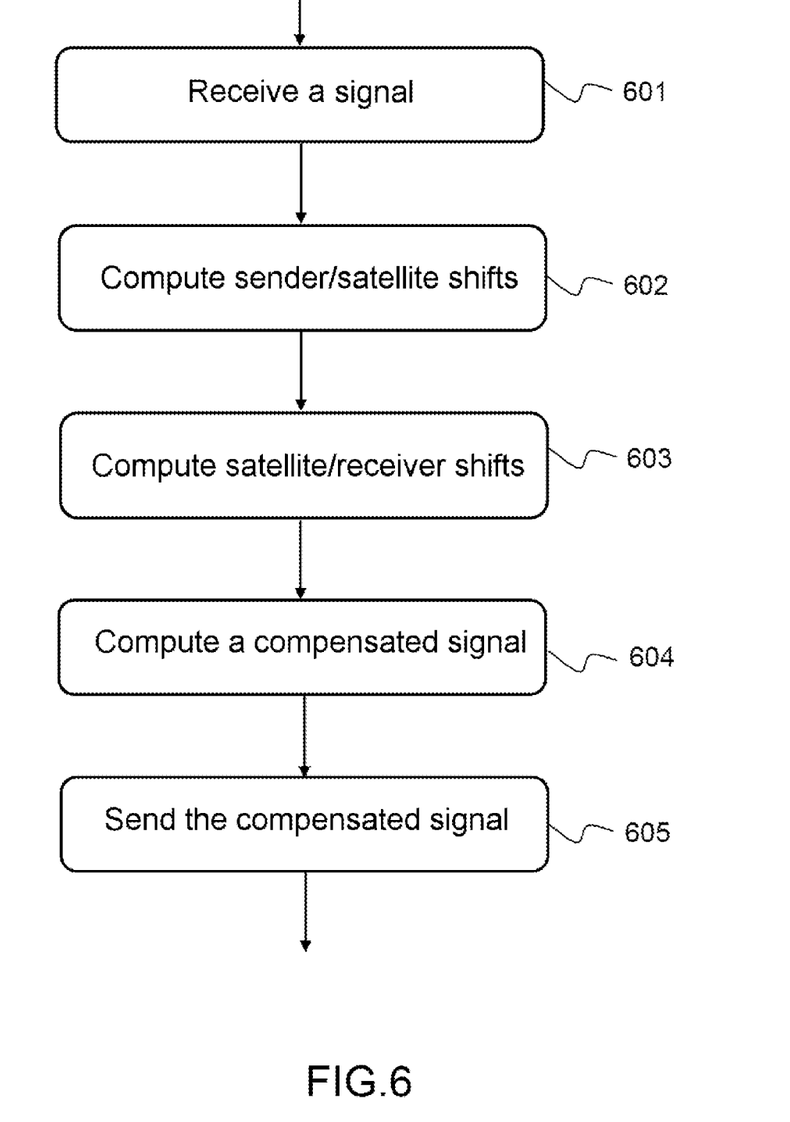
FIG. 6 presents a chart of the steps carried out in the communication method according to the invention when it is executed by a satellite.

FIG. 6 presents a chart of the steps carried out by the communication method according to the invention when it is executed by a satellite.

This method comprises a first step 601 of reception, by the satellite, of the signal sent by the sending station.

It thereafter comprises a second step 602 of computing, on the basis of the position (and speed) of the satellite, as well as of the position (and if available of the speed and direction) of the sender, at least one shift related to the propagation of the signal between the sender and itself. Here this entails computing at least one shift from among a time shift, a frequency shift, a phase shift and a power shift.

It comprises a third step 603, similar to step 602 but which now relates to the propagation between the satellite and the receiver.

The method also comprises a fourth step 604 of computing a compensated signal, on the basis of the signal received, to which are applied shifts which are inverse to the shifts computed during the second and third steps.

Finally, the method comprises a fifth step 605 of sending the signal thus compensated towards the receiving station.

Thus, the signal is received by the receiving station in a manner synchronized with the signals transmitted by way of the other satellites visible in common to both stations, the signals then recombining constructively.

Just as for the other methods presented, the steps of computing shifts can be carried out at a lower tempo than that of the repetition of the messages.

The methods represented in FIG. 4, FIG. 5 and FIG. 6 are intended to be executed respectively by a sender, by a receiver and by a satellite. They can be implemented, for example, in a reprogrammable computing machine, such as a processor, a DSP (the acronym standing for Digital Signal Processor), or a microcontroller. They can also be implemented in a dedicated computing machine, such as a set of logic gates such as an FPGA (the acronym standing for Field-Programmable Gate Array) or an ASIC, or in the form of any other hardware module allowing the execution of computations.

The methods described can be adapted to implement the alternative embodiments described hereinabove, such as for example the use of a direct sequence spread spectrum modulation, the addition of a frequency shift dependent on the satellite effecting the relaying of the signal, the repetition of the signal with various assumptions regarding movement, etc.

In the examples presented in FIGS. 1, 2 and 3, the prerequisite is that the position of the receiver is known to the sender, or that the position of the sender is known to the receiver, or that both positions are known to each of the satellites. However, this position may be known only approximately, since it varies over time, or located in a fairly imprecise manner.

The shifts computed so as to pre-compensate or post-compensate the signals may thus be marred by errors, the recombination of the signals then no longer being optimal. In particular, the recombination in phase of the various signals is very sensitive to errors of this type.

In order to more precisely estimate the shifts applied to the signals, it is proposed to supplement the methods presented previously by a specific protocol for signalling the positions, carried out prior to the actual transmission of the signal. This protocol can be carried out in various ways.

One such consists in using a waveform of spread spectrum type, allowing the best robustness to collisions and very good synchronization in time and in frequency, so as to transmit a low-bitrate message between the sender and the receiver by way of each of the satellites taken successively, the receiver responding to the message by a low-bitrate dedicated message, comprising information on the time shifts, frequency shifts, phase shifts and power shifts observed on reception. The message can be retransmitted periodically so as to limit drifts. Advantageously, the bitrate (and therefore the necessary link budget) of this message will be fixed so that it can be transmitted by a single satellite.

In another embodiment, the message is transmitted from the sender to the receiver by each of the satellites used for the transmission simultaneously. It has a means enabling the receiver to differentiate the provenance of the messages, such as sending on a particular frequency, or the use of a direct-sequence spread spectrum modulation, with a sequence specific to the satellite used. The receiver responds by way of a dedicated message comprising information on the time shifts, frequency shifts, phase shifts and/or arrival power shifts of each of the signals received. Here also, advantageously, the bitrates of the messages are fixed so that they are transmitted only by a single satellite on the outbound leg and on the return leg.

Another procedure, applicable in particular when the receiver is in charge of the compensation of the signals received on each of the satellites, consists in transmitting a dedicated signal, typically a signal of pure carrier type, in parallel with the useful signal, so as to make it easier to estimate the relative phases. When the signals' compensation is carried out at the sending end, a low-bitrate message can be transmitted by the receiver to the sender containing information on the arrival phase of the calibration carrier. Advantageously, the bitrate of these messages is fixed so that they are transmitted only by a single satellite on the outbound leg and on the return leg.

These calibration techniques make it possible to improve the compensation of the signals when mastery of the positions and of the movements of the various parties to the transmission is not perfect.

The satellite network according to the invention is an alternative to the satellite networks based on the formation of known beams of the state of the art. It presents the following advantages:

It makes it possible to improve the link budget in a manner directly proportional to the number of satellites used for the transmission. By way of example, the use of 10 satellites affords a gain of about 10 dB to the link budget;

Through the improvement of the link budget, it makes it possible to decrease the transmission power of each of the satellites;

It does not necessitate any prerequisite regarding the number of satellites used: the invention operates on the basis of a satellite with no particular gain, an additional gain being afforded by each of the additional satellites used as transmission relay;

It is compatible with deployment on LEO, MEO and GEO (the acronym standing for Geostationary Earth Orbit) satellites: the large-Doppler constraints of the deployment on networks of LEO satellites are removed since these shifts are compensated directly at the sender or receiver level as a function of the knowledge of the speed of the satellites, and potentially of that of the sender and/or of the receiver;

It does not necessitate any implementation of complex antennal systems at the level of the satellites, an antenna of omnidirectional type (or more exactly directed towards the Earth, that it covers as a single beam of uniform gain) or limited to a few spots making it possible to implement the invention, thus reducing the payload on the satellite;

The simplification of the antennal system on board the satellite renders it compatible with deployment on a network of MEO satellites;

The invention is robust to jamming, to masking and to faults, on account of the diversity afforded by the use of several satellites.

By way of example, a gain of 10 dB could be obtained by the invention when it is deployed on a network of 35 MEO satellites. The same gain could be obtained when the invention is deployed on a network of 500 LEO satellites.

The invention necessitates the use of means for separating the signals, and for processing them in parallel. The use of digital beamforming active antennas, allowing detection and simple formation of beams, on satellite gateways or satellite receivers, is well known to the person skilled in the art. For this purpose, the invention is particularly suitable for the case of deployment of a network according to a star network topology (also known as STAR network), in which all the transmissions are done by way of a central item of equipment of the network, of concentrator, switch or router type. This item of equipment is also generally used as gateway to exterior networks.

The invention adapts very simply to such a network topology, since, in order to be implemented according to one of the embodiments, it only requires that the central item of equipment be furnished with means for separating the transmissions towards and bound for each of the satellites. These separating means are generally present at the level of the central item of equipment, the benefit of the star topology being to furnish this item of equipment with very directional antennas so as to improve the end-to-end link budgets so as to be able to use very spectrally efficient modulation and coding schemes, and to exchange data at high throughput.

The management of accesses between the various users within the satellite network according to the invention is then done according to procedures known to the person skilled in the art, such as time-division multiplexing (or TDMA for the acronym Time Division Multiple Access), frequency-division multiplexing (or FDMA for the acronym Frequency Division Multiple Access), code-division multiplexing (or CDMA for the acronym Code Division Multiple Access), or by contention access.

The invention can also be used as a supplement to deployment based on beams, hence making it possible to increase the size of the satellite spots, thus reducing the constraints pertaining to the antenna on board the satellite.

The invention claimed is:

1. A satellite communications network, comprising at least one sending station, at least one receiving station, and a plurality of satellites, wherein a signal transmitted between the sending station and the receiving station is relayed by a plurality of satellites visible in common to both these stations, and wherein the position of the sending station, of the receiving station and of the satellites relaying the signal is known by at least one of these items of equipment, the said item or items of equipment furthermore being configured to separate the signals relayed by the satellites, and to compute, for each of these signals, at least one shift introduced by the propagation of the signal on the basis of the position of the sending station, of the position of the receiving station, and of the position of the satellite by which it is transmitted, and then to apply to the signal at least one shift which is inverse to the said computed shift or shifts.

2. The satellite communications network according to claim 1, wherein the computation of the shift or shifts is carried out further on the basis of at least one from among a velocity vector of the sending station, a velocity vector of the receiving station, and a velocity vector of the satellite by which the signal is relayed.

3. The satellite communications network according to claim 1, wherein the computation of the shift or shifts comprises at least one from among the computation of a time shift, of a frequency shift, of a shift in phase and of a shift in power.

4. The satellite communications network according to claim 1, wherein the separation of the signals relayed by the satellites is done by an active antenna.

5. The satellite communications network according to claim 1, wherein the separation of the signals relayed by the satellites is done by a plurality of directional antennas.

6. The satellite communications network according to claim 1, wherein the signal transmitted is modulated according to a direct-sequence spread spectrum technique, the sending station being configured to separate the signals relayed by the satellites by modulating each thereof by a distinct sequence, the receiving station being configured to separate the signals relayed by each of the satellites on the basis of the sequence used at the sending end.

7. The satellite communications network according to claim 1, wherein a carrier frequency of the signal transmitted by the sending station is adapted as a function of the satellite relaying the transmission, the sending station being configured to separate the signals relayed by the satellites by applying a distinct frequency shift to each thereof, the receiving station being configured to separate the signals relayed by each of the satellites on the basis of their carrier frequency.

8. The satellite communications network according to claim 1, wherein the sending station is configured to separate the signals relayed by the satellites and to repeat the signal transmitted, the inverse shifts applied to the signals for each of the repetitions being computed on the basis of different assumptions of a direction of movement of the receiver.

9. The satellite communications network according to claim 1, wherein the sending station is configured to send a signal dedicated to a calibration of the inverse shifts applied to the signals.

10. The satellite communications network according to claim 1, wherein the sending station and the receiving station are furthermore configured to exchange a synchronization message successively by each of the satellites used to relay the transmission before transmitting the signal.

11. The satellite communications network according to claim 1, wherein the sending station and the receiving station are furthermore configured to exchange a synchronization message simultaneously by each of the satellites used to relay the transmission before transmitting the signal.

12. A method for sending a signal from a sending station to a receiving station in a satellite communications network, the said network comprising a plurality of satellites visible in common both to the sending station and to the receiving station, the said sending station knowing its position and those of the receiving station and of the satellites visible in common, and being configured to separate the signals transmitted towards the satellites visible in common, the method comprising the steps of: selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, computation, for each of the satellites selected, of a pre-compensated signal by applying at least one shift which is inverse to the computed shift or shifts, and sending, to each of the selected satellites, the pre-compensated signal associated therewith.

13. A method for receiving a signal transmitted between a sending station and a receiving station in a satellite communications network, the said network comprising a plurality of satellites visible in common both to the sending station and to the receiving station, the said receiving station knowing its position and those of the sending station and of the satellites visible in common, and being configured to separate the signals received from the satellites of the network, the signal being relayed by a plurality of satellites from among the satellites visible in common, the method comprising the steps of: selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, reception of the signal from each of the satellites selected, computation, for each of the satellites selected, of a compensated signal by applying to the signal received at least one shift which is inverse to the computed shift or shifts, and summation of all the compensated signals.

14. A method for repeating a signal in a satellite during the transmission of a signal between a sending station and a receiving station in a satellite communications network, the said satellite being one from among a plurality of satellites of the network visible in common both to the sending station and to the receiving station, the said satellite knowing its position, the position of the sending station, and the position of the receiving station, and being configured to separate the signals received from the sender and the receiver, the method wherein the signal is relayed by a plurality of satellites, and comprising the steps of: reception of the signal transmitted from the sending station, computation of at least one first shift related to the propagation of the signal between the sender and the satellite on the basis of the position of the satellite, and of the position of the sender, computation of at least one second shift related to the propagation of the signal between the satellite and the receiver on the basis of the position of the satellite and of the position of the receiver, computation of a compensated signal, by applying to the signal received shifts which are inverse to the first and to the second computed shifts, and sending the compensated signal to the receiving station.

15. A sending station configured to implement a method for sending a signal from the sending station to a receiving station in a satellite communications network, the said network comprising a plurality of satellites visible in common both to the sending station and to the receiving station, the said sending station knowing its position and those of the receiving station and of the satellites visible in common, and being configured to separate the signals transmitted towards the satellites visible in common, the method comprising the steps of: selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, computation, for each of the satellites selected, of a pre-compensated signal by applying at least one shift which is inverse to the computed shift or shifts, and sending, to each of the selected satellites, the pre-compensated signal associated therewith.

16. A receiving station configured to implement a method for receiving a signal transmitted between a sending station and the receiving station in a satellite communications network, the said net work comprising a plurality of satellites visible in common both to the sending station and to the receiving station, the said receiving station knowing its position and those of the sending station and of the satellites visible in common, and being configured to separate the signals received from the satellites of the network, the signal being relayed by a plurality of satellites from among the satellites visible in common, the method comprising the steps of: selection, from among the satellites visible in common, of a plurality of satellites used to relay the transmission of the signal, computation, for each of the satellites selected, of at least one shift related to the propagation of the signal on the basis of the position of the sending station, of the position of the receiving station, and of the position of the said satellite, reception of the signal from each of the satellites selected, computation, for each of the satellites selected, of a compensated signal by applying to the signal received at least one shift which is inverse to the computed shift or shifts, and summation of all the compensated signals.

17. A satellite configured to implement a method for repeating a signal in the satellite during the transmission of a signal between a sending station and a receiving station in a satellite communications network, the said satellite being one from among a plurality of satellites of the network visible in common both to the sending station and to the receiving station, the said satellite knowing its position, the position of the sending station, and the position of the receiving station, and being configured to separate the signals received from the sender and the receiver, the method wherein the signal is relayed by a plurality of satellites, and comprising the steps of: reception of the signal transmitted from the sending station, computation of at least one first shift related to the propagation of the signal between the sender and the satellite on the basis of the position of the satellite, and of the position of the sender, computation of at least one second shift related to the propagation of the signal between the satellite and the receiver on the basis of the position of the satellite and of the position of the receiver, computation of a compensated signal, by applying to the signal received shifts which are inverse to the first and to the second computed shifts, and sending the compensated signal to the receiving station.

18. The satellite communications network according to claim 3, wherein the computation of the shift or shifts comprises the computation of a time shift, of a frequency shift, and of a shift in phase.

19. The method for sending the signal according to claim 12, wherein the computation of the shift or shifts comprises the computation of a time shift, of a frequency shift, and of a shift in phase.

20. The method for receiving the signal according to claim 13, wherein the computation of the shift or shifts comprises the computation of a time shift, of a frequency shift, and of a shift in phase.

21. The method for repeating the signal according to claim 14, herein the computation of the shift or shifts comprises the computation of a time shift, of a frequency shift, and of a shift in phase.

* * * * *